United States Patent [19]

Miyamoto et al.

[11] Patent Number: 5,321,672

[45] Date of Patent: Jun. 14, 1994

[54] METHOD OF AN APPARATUS FOR MAGNETO-OPTICALLY RECORDING INFORMATION BY CHANGING THE POSITION OR SHAPE OR CONTROLLING THE DIAMETER OF REVERSED DOMAINS

[75] Inventors: Harukazu Miyamoto; Yoshio Suzuki, both of Kodaira; Toshio Niihara, Sayama; Norio Ohta, Iruma; Masahiko Takahashi, Hachioji; Fumiyoshi Kirino, Tokyo; Yumiko Anzai, Tachikawa, all of Japan

[73] Assignee: Hitachi, Ltd., Tokyo, Japan

[21] Appl. No.: 509,754

[22] Filed: Apr. 17, 1990

[30] Foreign Application Priority Data

Apr. 19, 1989 [JP] Japan .................. 1-097311
Apr. 21, 1989 [JP] Japan .................. 1-100122

[51] Int. Cl.$^5$ .............................. G11B 13/04
[52] U.S. Cl. ......................... 369/13; 369/47; 369/48; 369/59; 369/116
[58] Field of Search .............. 369/13, 47, 48, 59, 369/116; 360/50, 114

[56] References Cited

U.S. PATENT DOCUMENTS

| 3,513,457 | 5/1970 | Nelson | 369/13 |
|---|---|---|---|
| 4,308,612 | 12/1981 | Miyauchi et al. | 369/48 |
| 4,357,635 | 11/1982 | Hasegawa | 360/48 |
| 4,410,877 | 10/1983 | Carasso et al. | 369/59 |
| 4,494,226 | 1/1985 | Hazel et al. | 369/54 |
| 4,558,441 | 12/1985 | Yokota et al. | 369/59 |
| 4,646,103 | 2/1987 | Sigiyama et al. | 369/116 |
| 4,736,258 | 4/1988 | Noble et al. | 369/59 |
| 4,815,064 | 3/1989 | Melbye | 369/59 |
| 4,819,222 | 4/1989 | Kimura | 369/59 |
| 4,872,078 | 10/1989 | Gerber et al. | 360/114 |
| 4,882,718 | 11/1989 | Kryder et al. | 365/122 |
| 4,910,622 | 3/1990 | Saito et al. | 369/13 |
| 4,932,014 | 5/1990 | Tamiya | 369/48 |
| 4,964,094 | 10/1990 | Satoh et al. | 369/59 |
| 5,016,232 | 5/1991 | Tadokoro et al. | 369/13 |
| 5,020,040 | 5/1991 | Lee | 369/13 |
| 5,020,041 | 5/1991 | Nakao et al. | 369/13 |
| 5,025,430 | 6/1991 | Takokoro et al. | 360/59 |
| 5,132,945 | 7/1992 | Osato et al. | 365/122 |

FOREIGN PATENT DOCUMENTS

| 55-4724 | 1/1980 | Japan | 369/59 |
|---|---|---|---|
| 58-83347 | 5/1983 | Japan . | |
| 61-273779 | 12/1986 | Japan | 369/59 |
| 63-217548 | 9/1988 | Japan . | |
| 01151041 | 6/1989 | Japan . | |

Primary Examiner—Eugene R. LaRoche
Assistant Examiner—Christopher R. Glembocki
Attorney, Agent, or Firm—Antonelli, Terry, Stout & Kraus

[57] ABSTRACT

A magneto-optical recording device for radiating a laser beam according to recording information onto a magneto-optical recording medium having an easy axis of magnetization in a direction perpendicular to a film face of the recording medium itself to form a reversed domain and record information, which forms a reversed domain by radiating a laser beam and moves the position of the reversed domain to record information. In an embodiment of the present invention, it becomes possible to over-write new information without erasing beforehand information already recorded by only controlling the intensity, pulse width, radiation position and radiation time of the laser beam without providing a special bias magnetic field for reversing the magnetic field.

6 Claims, 6 Drawing Sheets

ENLARGED VIEW OF RECORDED MARKS

FIG. 18A

FIG. 18B

METHOD OF AN APPARATUS FOR MAGNETO-OPTICALLY RECORDING INFORMATION BY CHANGING THE POSITION OR SHAPE OR CONTROLLING THE DIAMETER OF REVERSED DOMAINS

BACKGROUND OF THE INVENTION

The present invention relates to a magneto-optical recording device for performing write-read with respect to a magneto-optical film having an easy axis of magnetization in a direction perpendicular to the film face of a recording medium by using a laser beam, and in particular to a magnetic-fieldless magneto-optical recording device capable of over-writing information without using a special reversible magnetic field applying means and a method of performing multi-state recording or half-tone recording by using difference in recorded mark size.

Figure 3:
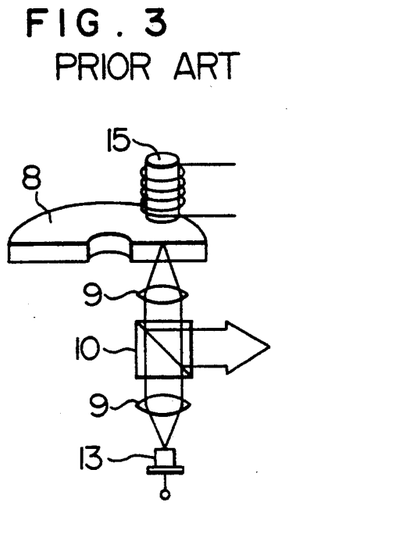
FIGS. 3 and 4 are configuration diagrams of magneto-optical recording of the prior art.

An example of prior art of magneto-optical recording for performing write-read with respect to a magneto-optical recording film having an easy axis of magnetization in a direction perpendicular to the film face of the recording film itself by using a laser beam has configuration as shown in FIG. 3, for example.

First of all, in write operation, a beam emitted from a laser 13 shown in FIG. 3 is collimated by a lens 9 into a parallel beam. The beam passed through a beam splitter 10 is focused by another lens 9 to form a light spot on a magneto-optical recording medium 8. The intensity of this beam is modulated according to the recording information. The beam absorbed at the light spot raises the temperature of the magneto-optical recording medium near the Curie temperature. At high temperatures, the coercive force of the magneto-optical recording medium is extremely small. By a bias magnetic field applied onto the magneto-optical recording medium by a magnetic field applying means 15, magnetization of a portion of the magneto-optical recording medium heated by the laser beam is reversed, a reversed domain being thus formed. When information written as this reversed domain is to be read, the same laser beam as that used in the write operation with intensity weakened is applied onto the magneto-optical recording medium. The resultant reflected beam is led to an optical system for reproducing by the beam splitter 10. Rotation of polarization caused by the Kerr effect is then detected. For rewritting this information written once, the above described laser beam is continuously radiated and the polarity of the magnetic field applied by the magnetic field applying means is made opposite to that in the write operation, the recorded reversed domain being thus erased. Thereafter, write operation is performed in the same way as the foregoing description. This method is described in JP-B-57-34588 (Published on Jul. 23, 1982, corresponding to U.S. Ser. No. 284,513 filed on Aug. 29, 1972), for example.

In the above described example of the prior art, however, the procedure of erasing information once and then writing information must be executed in rewritting operation. Therefore, several over-writing methods allowing direct over-writing without the necessity of erasing have already been proposed.

Figure 4:
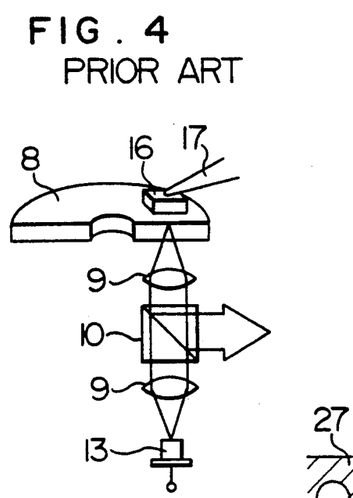

FIG. 4 shows an example of configuration for over-writing. With reference to FIG. 4, a beam emitted from a laser 13 is collimated into a parallel beam by a lens 9 in the same way as the above described example of FIG. 3. The beam passed through a beam splitter 10 is focused by another lens 9 to form a light spot on a magneto-optical recording medium 8. The laser beam is continuously radiated onto a magneto-optical recording medium 8. A magnetic field modulated at high speed according to recording information is applied by a flying magnetic head 16 to a portion of the magneto-optical recording medium 8, which has been so heated by the laser beam as to be nearly at the Curie temperature and have a reduced coercive force. In this way, magnetization of the magneto-optical recording medium 8 is directed in the direction of the applied magnetic field, a recorded domain being thus formed. At this time, high-speed modulation with a recording frequency of 10 to 20 MHz is possible. Since the laser beam is continuously radiated, a recorded domain is formed irrespective of information recorded before, high-speed overwriting being realized. At this time, this flying magnetic head 16 is stably held at a point where buoyancy due to an air current caused by the rotation of the magneto-optical recording medium 8 balances the force of a supporting spring 17. The spacing between this flying magnetic head 16 and the magneto-optical recording medium 8 is 5 to 10 μm. This method has been proposed in JP-A-63-217548, for example.

In the above described example of the prior art, means for applying a reversible bias magnetic field to the radiation position of the optical beam must be provided, resulting in complicated configuration of the apparatus. It thus becomes difficult to reduce the size and cost of the apparatus.

Further, in the above described example of the prior art, the width of the recorded domain varies according to the environment, wherein the apparatus is used, such as temperature. This results in a problem that residue of information recorded before is caused.

Further, in the above described example of the prior art, the recorded domain does not take the shape of a circle but takes the shape of chevron. Therefore, the shape of the domain is not necessarily uniform. As a result, noises in recording operation are increased, high density recording being difficult.

Further, in the above described example of the prior art, the write rate of recording information (i.e., the data transfer rate) depends upon the reversing rate of the applied magnetic field, high-speed recording being not easy.

Further, in the prior art, multi-state or analog high density recording is not easy because the apparatus becomes complicated and residue tends to be caused.

SUMMARY OF THE INVENTION

An object of the present invention is to provide a magnetic-fieldless magneto-optical over-writing apparatus which is cleared of the above described problems, which is simple in configuration and low in cost, which is operable at high speed, which is free from residue in essence, and which is high in quality and reliability.

Another object of the present invention is to provide a magnetic-fieldless over-writing apparatus for high-density, high-quality magneto-optical recording capable of performing multi-stage or analog recording.

In accordance with the present invention, the following means are provided in order to achieve the above described objects.

1. In a magneto-optical recording device for radiating a laser beam according to recording information onto a magneto-optical recording medium having an easy axis of magnetization in a direction perpendicular to a film face of the recording medium itself to form a reversed domain and record information, information recording means comprises means for forming a reversed domain smaller than a light spot by radiating a laser beam and for moving the position of said reversed domain within the region of said light spot to record information. Further, in order to perform recording more stably, a fixed magnetic field may be applied at the time of recording. As the means for applying this fixed magnetic field, a permanent magnet, for example, may be used. Or a stray field from a lens actuator driving a lens for the purpose of automatic focus control and tracking may also be used. From the viewpoint of reduction in apparatus size, the latter one is more preferable.

Figure 1:
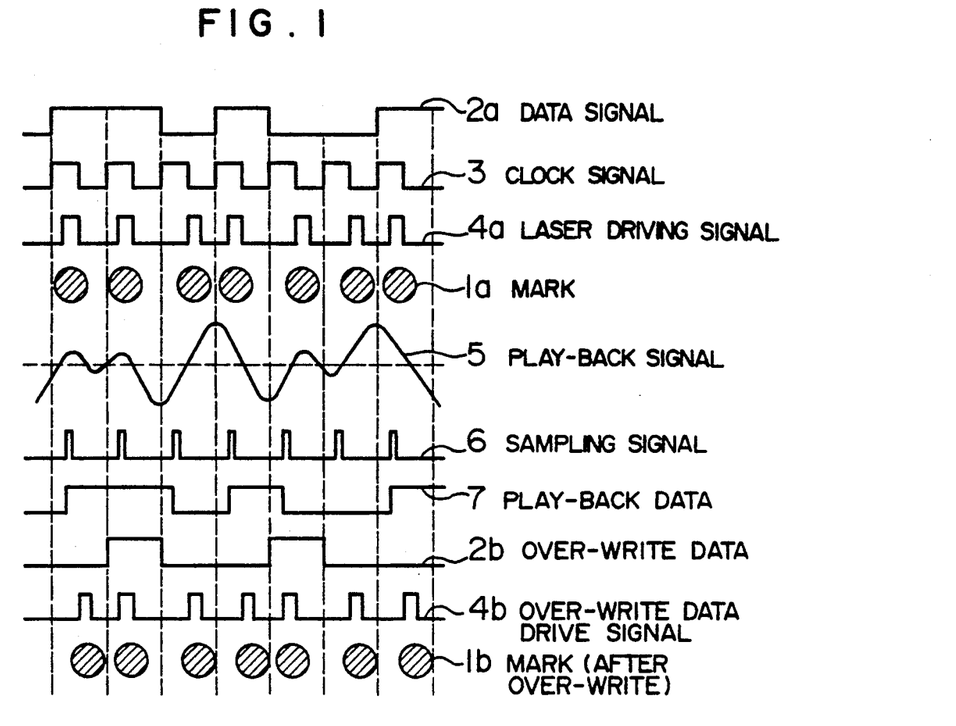
FIG. 1 is a diagram for illustrating write-read operation and over-writing operation of the present invention.
Figure 2:
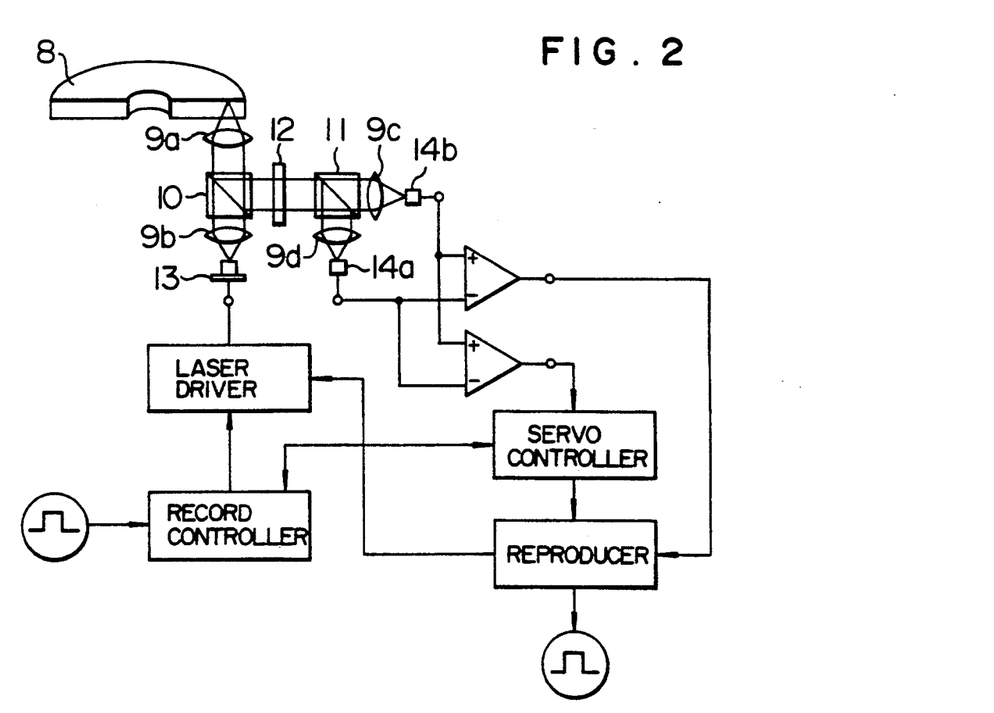
FIG. 2 is a configuration diagram of the present invention.

FIGS. 1 and 2 correspond to the present means.

2. The information recording means comprises means for changing the intensity of the laser beam or the radiation time of the laser beam to change the shape of the reversed domain and record information.

In this case as well, external magnetic field applying means is not especially required. For this purpose, however, a fixed magnetic field may be applied in the same way as the foregoing description.

Figure 6:
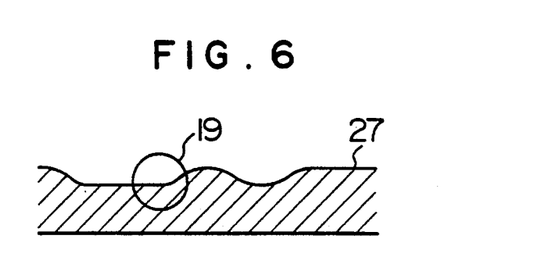
Figure 10:
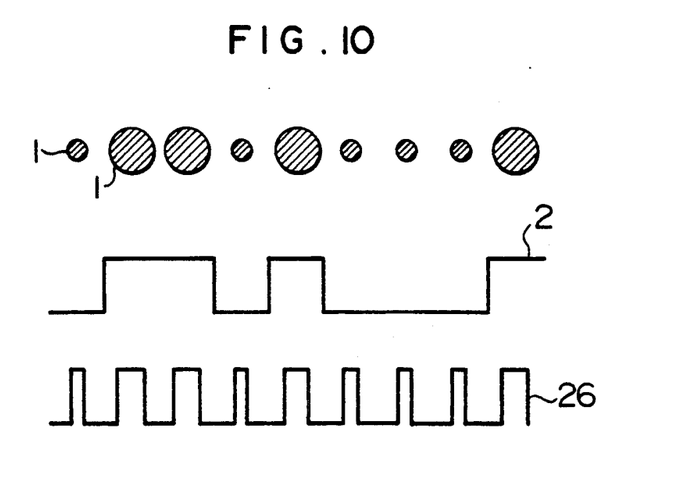

Together with FIG. 2, FIGS. 6 and 10, the example, correspond to the present means.

3. In the means described above in item 1, the means for moving the position of the reversed domain within the region of the light spot to record information comprises means for radiating a laser beam in a pulsative form nearly with a fixed period and for radiating a laser beam at time shifted forward or backward from the fixed period according to the recording information.

The value of fixed shift in the forward or backward direction on time axis is preferably 1/5 or less of the above described fixed period. Further, the pulse width (i.e., radiation time) of the laser beam is preferably 2/5 or less of the above described fixed period. Between the above described pulses, the laser beam is not radiated or the laser beam is radiated weakly as compared with the pulse portion.

FIG. 1 corresponds to this.

4. Further, in the means described above in item 1, the means for moving the position of the reversed domain within the region of the light spot to record information comprises means for radiating a laser beam in a pulsative form nearly with a fixed period and for moving a light spot obtained by focusing the radiated laser beam in the longitudinal direction or in the lateral direction with respect to the direction of relative movement between the light spot and the magneto-optical recording medium according to recording information.

This brings about an advantage of higher density.

Figure 5:
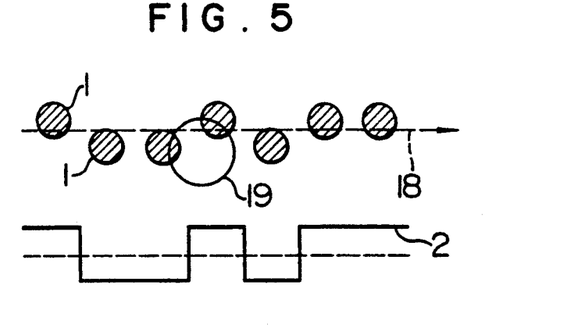
FIGS. 5, 6, 7, 8, 9, 10, 11 and 12 are diagrams showing embodiments of the present invention.

FIG. 5 corresponds to this.

5. Further, in the means described above in item 1, the means for moving the position of the reversed domain within the region of the light spot to record information comprises means for changing the magnitude of movement of the position of the reversed domain or the magnitude of shift of radiation time of the laser beam in a digital manner with multi-state having two or more states or in an analog manner according to recording information to record information. This brings about an advantage that higher density recording is allowed.

This means correspond to use of a multi-state or analog form in the example shown in FIG. 5.

6. Further, in the means described above in item 2, the means for changing the shape of the reversed domain to record information comprises means for changing the size of the reversed domain in a digital manner with multi-state having two or more states or in an analog manner according to recording information to record information.

Figure 12:
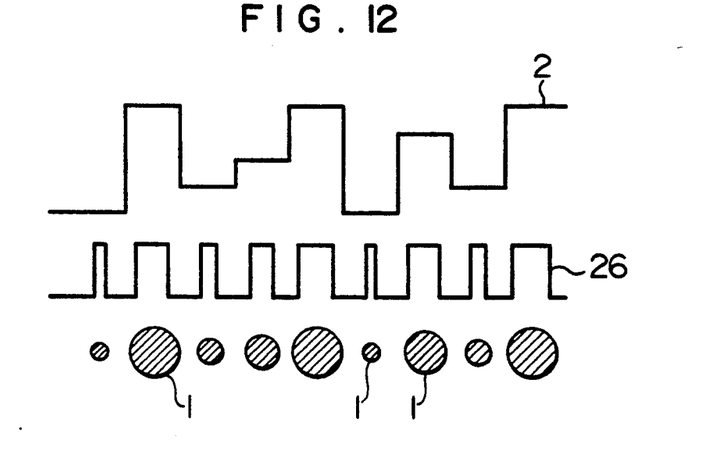

An example of this means is shown in FIG. 12.

7. Further, in the means heretofore described, the reversed domain nearly takes the shape of a circle as indicated in the above described examples.

This results in an advantage of reduced noise.

8. Further, in the means described above in items 1 to 4, the reversed domain is formed beforehand prior to information recording.

This results in an advantage of further higher stability of recording.

Figure 7:
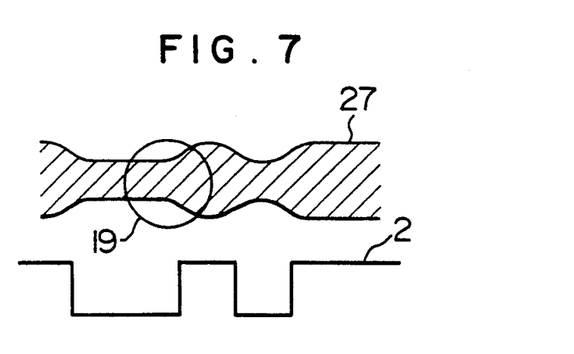
Figure 8:
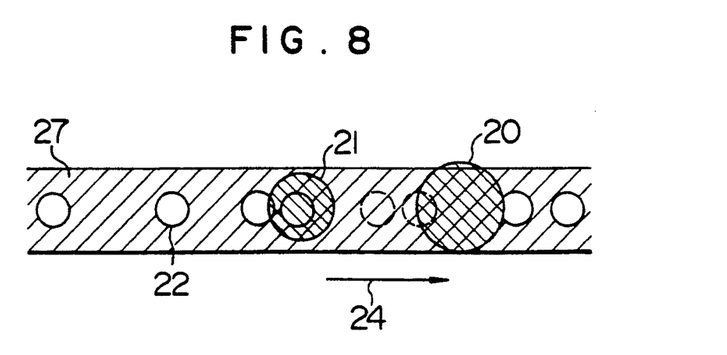

Its examples are shown in FIGS. 6 to 8.

9. Further, in the means described above in item 8, the reversed domain formed in advance before information recording takes the shape of stripe parallel to the direction of relative movement between the light spot and the magneto-optical recording medium, and the magneto-optical recording device comprises means for changing the width of the stripe reversed domain according to recording information to record information.

In this means, means for changing the position of the light spot and the radiation time of laser pulse to record information or means for changing the intensity of the laser beam or the radiation time of the laser beam can be used.

Therefore, it is possible to limit the change of the apparatus of the prior art to a slight degree. This results in an advantage that high-speed overwriting without using magnetic field can be performed while maintaining the interchangeability with a product of the prior art.

Examples of this means are shown in FIGS. 6 and 7.

10. With reference to the above described item 1 or 3, the means for moving the position of the reversed domain within the region of the light spot to record information comprises means for radiating a laser beam in a pulsative form at such radiation intervals as to comprise a period having a duration sufficiently shorter than time required for the light spot to move relatively on the reversed domain and another portion having a duration nearly equivalent to the above described time. This results in an advantage of interchangeability with a product of the prior art.

Figure 11:
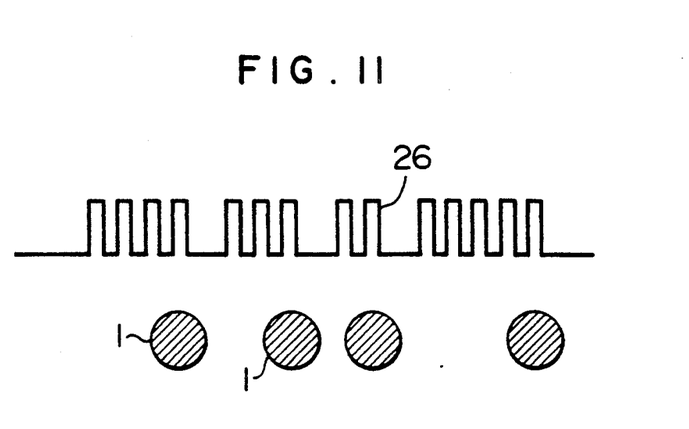

An example of this means is shown in FIG. 11.

11. Information is recorded by controlling the diameter of the above described reversed domain.

As a result, multi-state recording becomes possible, and the recording capacity is significantly increased.

An example of this means is shown in FIG. 12.

12. Control of the diameter of the reversed domain is performed by means of controlling the pulse width of the laser beam.

Control of the pulse width of the laser beam can be performed by means of only switching time of the laser light output and does not need an analog circuit. Therefore, multi-state recording can be realized more easily.

Figure 14:
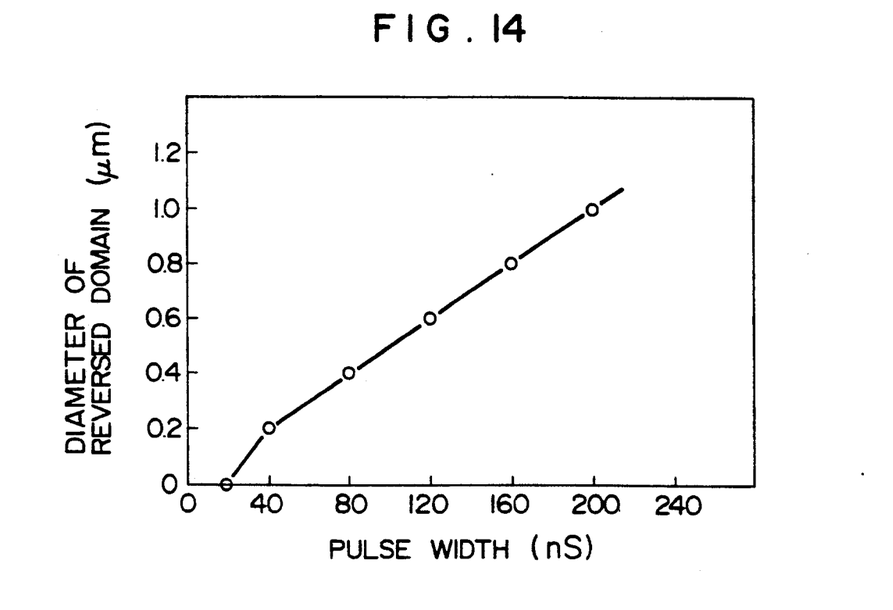
FIG. 14 is a diagram showing the relationship between the pulse width of a laser beam and the diameter of an obtained reversed domain.

An example of this means is shown in FIG. 14.

13. Multi-state recording is performed by using difference in play-back signal caused by difference in reversed domain size.

This means uses the fact that the play-back signal becomes large as the recorded reversed domain is made large. This means also allows increase in recording capacity.

Figure 15:
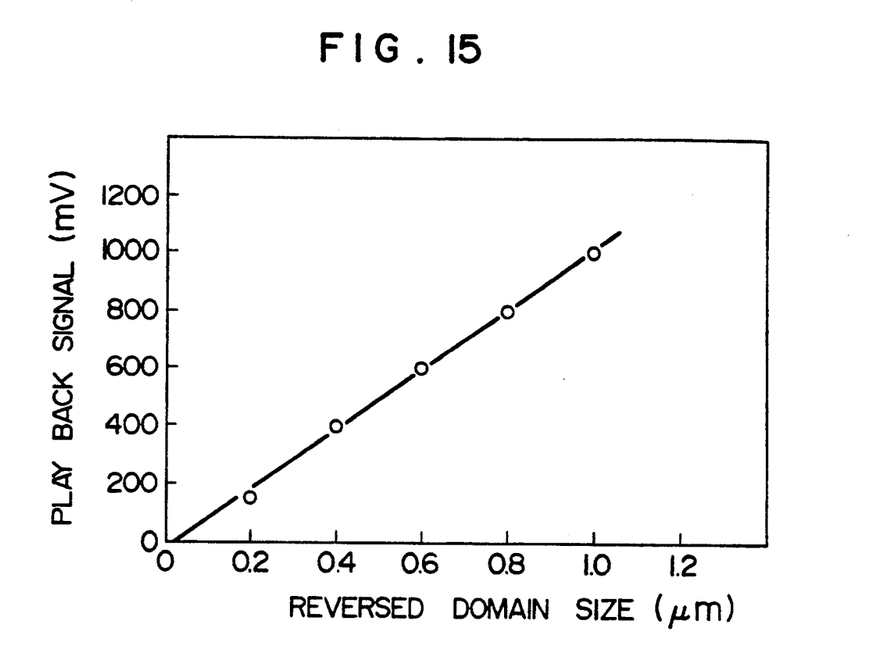
FIG. 15 is a diagram showing the relationship between the size of a reversed domain and the play-back signal.

An example of this means is shown in FIG. 15.

14. Information recording is so performed as to form half-tone by changing the reversed domain size and/or face density.

This means also allows increase in recording capacity.

Figure 17:
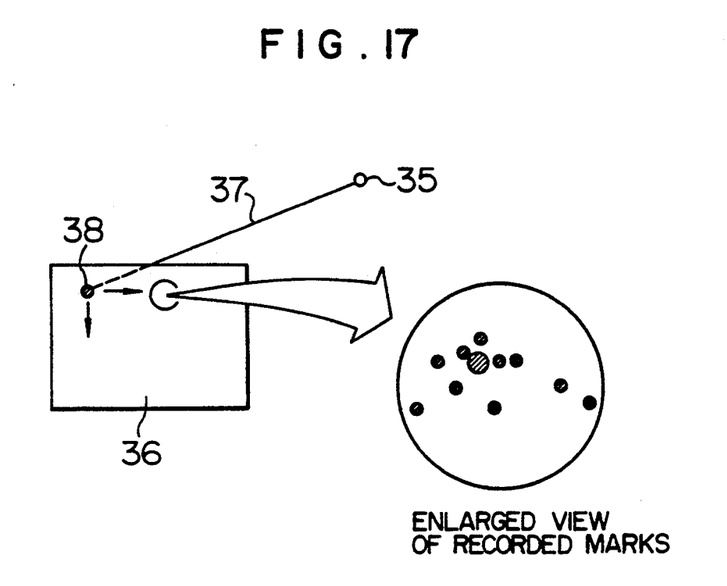
FIG. 17 is a diagram showing the principle of image recording.

An example of this means is shown in FIG. 17.

15. As a material having perpendicular magnetic anisotropy, an alloy, and preferably an amorphous alloy mainly comprising a rare-earth element and transition metal is used.

This material facilitates control of the reversed domain diameter and face density.

16. At the time of recording, a bias magnetic field is not applied from the outside or the bias magnetic field has intensity of 100 Oe or loss, resulting in simple configuration and low cost of the apparatus.

17. New information is directly recorded on information already recorded without performing erasing operation.

This means makes possible high-speed recording.

Figure 16:
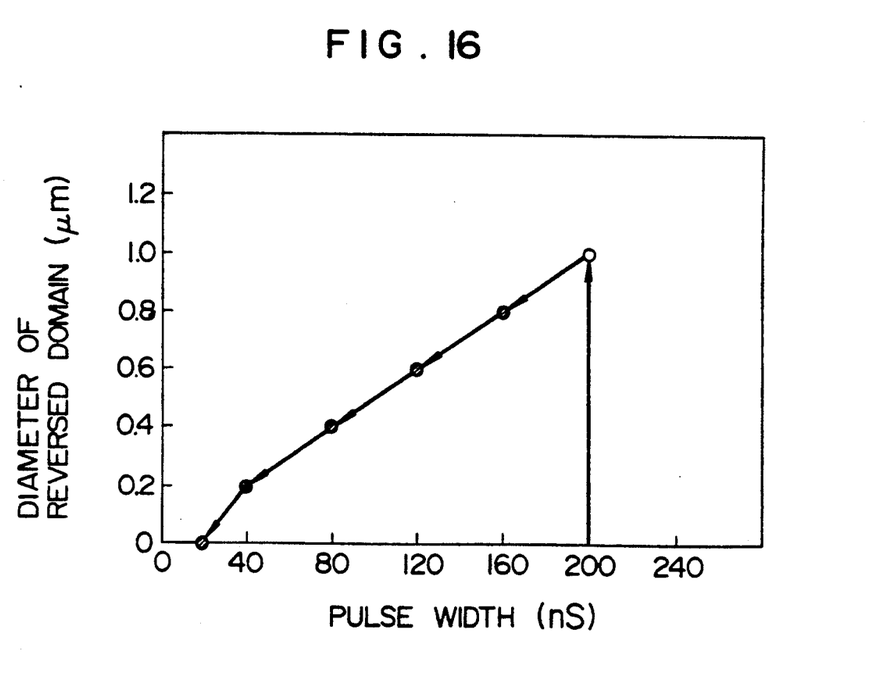
FIG. 16 is a diagram showing the over-writing characteristic.

An example of this means is shown in FIG. 16.

18. Image data are recorded by using the above described recording means. Means of the present invention are suitable to image data recording because large-capacity, high-speed recording can be performed.

19. Reversed domains are distributed in two-dimensional directions. This also allows a larger capacity and a higher speed of recording.

An example of this means is shown in FIG. 5.

20. Two-dimensional distribution of reversed domains is implemented by scanning the laser beam or a substrate in a certain face in the lateral direction and by successively moving the scan in the longitudinal direction.

This facilitates two-dimensional distribution of reversed domains.

An example of this means is shown in FIG. 5.

21. The pulse width of the laser beam is controlled while the laser beam is being scanned in the lateral direction or in the longitudinal direction.

Thereby, further higher density can be realized.

22. Prior to recording new information, sweeping with a continuously oscillated pulse beam is performed and thereafter an information pulse beam is radiated.

This eliminates the fear of residue.

23. Information contained in pulse width is converted into information contained in reversed domain diameter. This facilitates analog write-read operation.

An example of the present means is shown in FIG. 14.

24. Multi-state recording is performed by changing the reversed domain size and/or reversed domain face density.

This allows further increase in recording capacity.

Figure 18A:
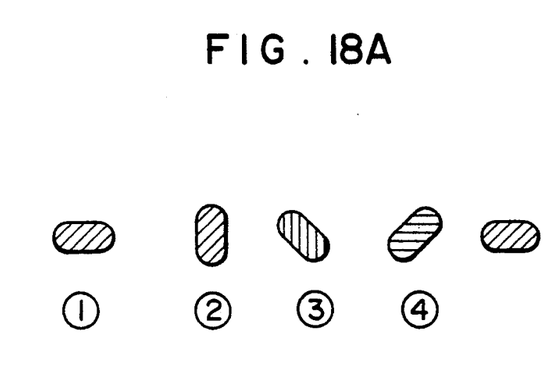
FIGS. 18A and 18B are diagrams showing the principle of multi-state recording using holography.
Figure 18B:
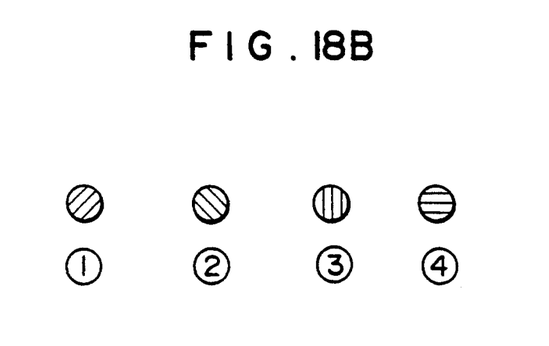

Examples of this means are shown in FIGS. 17 and 18.

For achieving the objects of the present invention, one laser light source need not necessarily be provided. For example, ① two laser beam sources are provided. The reversed domain is initialized by the first light source, and information is written by the second light source. In this case, the domain in the initialized state preferably takes the shape of a stripe parallel to the direction of relative movement between the light spot and the magneto-optical recording medium as described before. In that case, the domain after write operation may take such a shape that the width of a stripe domain is modulated according to the recorded information. Further, the domain after write operation may take such a shape that nearly a circular domain reversed again is formed right in the center of a stripe domain. Alternatively, ② there may be provided three laser light sources comprising a first light source for initializing a reversed domain, a second light source for writing information, and a third light source for confirming the written information. In either case, information is written by radiating a laser beam and changing the position of the domain, the shape of the domain or the position of the side of the domain.

1. First of all, the principle of forming a mark will now be described. With reference to FIG. 2, a pulsative beam emitted from a laser 13 is applied onto a magneto-optical recording medium 8 having an easy axis of magnetization in a direction perpendicular to the film face of the recording medium itself through a lens 9b, a beam splitter 10 and a lens 9a, a light spot being formed. The recording medium 8 is heated near the Curie temperature by this light spot. In this heated portion, a reversed domain is formed by a stray field caused by magnetization of its surrounding portions. The temperature of the recording medium 8 drops when radiation of the light pulse has finished. At this time, the size of the above described reversed domain also becomes small and settles down to a certain size. The certain size depends upon magnetic characteristics of the recording medium 8 such as its coercive force, saturation magnetization, magnetic wall energy and perpendicular anisotropy, power and radiation time of laser pulses, thermal diffusion rate of the recording medium 8, relative speed between the light spot and the recording medium, and the like. The mark of a certain size is thus formed.

If a laser beam is radiated onto nearly the same position on the recorded mark, the temperature of the recording medium 8 rises nearly to the Curie temperature in the same way as the write operation. A reversed domain having such a size as to embrace the mark already recorded is thus formed. Thereafter, the temperature drops and the size of the reversed domain is reduced. A mark similar to that in the write operation is formed. The position whereat this mark is formed does not depend upon the position whereat the mark is first recorded but depends upon the position of the laser beam radiated later. That is to say, the mark can be moved by radiating a laser beam onto nearly the same position on the mark already written. As a result, the information written first is completely erased, and new information can be written.

That is to say, the above described means of the item 1 does not need application of a special magnetic field for forming a reversed domain, resulting in simplified apparatus configuration, reduced apparatus size, lowered cost and higher speed recording. Further, magnetic recording which is free from residue in essence and which has high quality and high reliability is made possible.

2. The process of write-read operation using the above described principle will now be described. With reference to FIG. 1, a laser driving signal 4a has already undergone phase modulation backward and forward with respect to a clock signal 3 according to a data signal 2a. That is to say, the pulse of the laser driving signal 4a is radiated before the falling edge of the clock signal, when the value of the data signal 2a is at its high level. When the value of the data signal 2a is at its low level, the pulse of the laser driving signal 4a is radiated after the falling edge of the clock signal. As a result, a mark 1a recorded on the recording medium 8 is so modulated that its position may be displaced backward or forward. That is to say, a phase-modulated signal is recorded. When this signal is to be read, a play-back signal 5 reflects the proportion of the mark located within the light spot. By slicing this play-back signal with an appropriate level and holding it with a sampling pulse 6, play-back data 7 is obtained. The data signal 2 is thus reconstructed faithfully.

In over-writing operation, a laser driving signal 4b is generated according to over-writing data 2b in the same way as the recording process. On the basis of this laser driving signal 4b, a laser pulse is radiated onto the recording medium 8 having old data already recorded thereon. The position whereto this laser pulse is radiated is displaced a little forward or backward from the position of the mark recorded first. Therefore, the old mark moves to the position whereto the laser beam has been newly radiated. That is to say, old recording information is replaced by new recording information, over-writing having been thus formed.

That is to say, the means for changing the radiation time of the laser beam according to the recording information described before in the item 3 makes the write-read operation possible as heretofore described.

As compared with the means for thus changing the recording position on the time domain to make the write-read operation possible, the means described before in the item 4 changes the recording position on the space domain to make the write-read operation possible.

Further, the means described before in the item 5 moves the recording position in a multi-state or analog form to make writing multi-state or analog information possible.

In either case, application of a special magnetic field is not required for the write operation, resulting in simplified apparatus configuration.

3. In the over-writing operation heretofore described, the mark position is moved. Instead of moving the position, however, a change of mark shape, for example, may be used to perform over-writing similar to that described above. For this purpose, the position of the magnetic wall is moved.

The position of the magnetic wall can be moved by changing the intensity of the laser beam or the pulse width (i.e., the radiation time). That is to say, the magnetic wall moves in such a direction as to widen the reversed domain if the intensity of the radiated laser beam is large or the radiation time is long. On the contrary, the magnetic wall moves in such a direction as to narrow the reversed domain if the intensity of the radiated laser beam is small or the radiation time is short. This is because the area of the reversed domain is widened when the temperature of the recording medium rises high as a result of radiation of the laser beam, and the thermal distribution becomes loose and the position of the magnetic wall of the reversed domain region once widened is virtually fixed when the temperature falls.

That is to say, radiation with intensity of the laser beam or the radiation time of the laser beam changed by using the means as described in the item 2 functions to change the shape of the reversed domain. Changing the shape of the reversed domain results in providing recording information.

In this case, a special magnetic field is not applied for changing the shape of the reversed domain and the problem of information residue is not posed, resulting in effects similar to those of the item 1.

Further, the means described before in the item 6 utilizes this fact to make it possible to write not only bi-state digital information but also multi-state or analog information.

4. The present invention makes it possible to form a reversed domain having almost the shape of a circle. It thus becomes, easy to record the reversed domains to have uniform shapes. Therefore, the means of the item 7 thus functioning makes possible writing operation with low noise and high density.

5. The means described before in the item 8, which forms beforehand a reversed domain before writing information in the first attempt, thereby facilitates performing information writing in the first attempt in the same way as over-writing information over various information pieces already written. More stable writing is thus made possible.

6. When the means for changing the shape of a reversed stripe domain as described before in the item 9 is used, the position information of the magnetic wall provides stable, highly reliable recording information.

7. Further, by making the interval of laser beam radiation short as described before in the item 10 and moving the above described reversed domain nearly continuously, over-writing can also be performed. In this case, a reversed domain recorded before is erased by radiation of a laser beam, and a reversed domain newly formed moves with the laser beam. If the interval of radiation of the laser beam is prolonged over a portion at that time, the reversed domain does not move but remain in that portion. That remaining domain can be recorded as information.

8. In either case heretofore described, the shape or position of the mark already recorded can be changed by radiating a laser beam, which is modulated in position, intensity or time by information to be over-written, onto the magneto-optical recording medium 8 having information already recorded thereon. Therefore, information can be over-written. Further, in this case, a special device such as magnetic field applying means is not required, and the problem such as residue is not caused.

9. The size of the resultant recorded mark can be arbitrarily selected by changing the pulse width of the laser pulse beam. As a result, multi-state writing can be performed instead of conventional bi-state writing comprising "0" and "1". This is realized by using the fact that the play-back signal changes according to the size of the recorded mark. Further, since a recorded mark having an arbitrary size can be formed, half-tone is formed by two-dimensional distribution of recorded marks. Thereby, image data or the like can be written. Further, it can also be applied to write operation using holography.

DESCRIPTION OF THE PREFERRED EMBODIMENTS EMBODIMENT 1

FIG. 2 is a configuration diagram showing an embodiment of the present invention. With reference to FIG. 2, a beam emitted from a laser 13 is collimated into a parallel beam by a lens 9b. After being passed through a beam-splitter 10, the beam is focused onto a disklike recording medium 8 by a lens 9a. The wavelength of this laser beam is 680 nm, and the numerical aperture of the condenser lens is 0.6. The diameter of the light spot formed by them is approximately 1.1 μm. The beam reflected from this light spot is reflected by a beam splitter 10. The direction of the polarization of the reflected beam is rotated by 45 degrees by a half-wave plate 12. The resultant beam is divided into two polarization components by a polarizer 11. The two polarization components are led to detectors 14a and 14b, respectively. Outputs of these two detectors 14a and 14b undergo processing of addition and subtraction. Resultant signals are led to a servo control system and a reproducer processing system. Here, the sampled servo method is used as the servo method. A clock serving as the reference for both the write operation and the read operation is obtained from wobbled marks buried beforehand as pits on the recording medium.

Process of the write-read operation and over-writing operation in this embodiment will now be described. With reference to FIG. 1, the laser driving signal 4a is so phase-modulated as to be located forward or backward with respect to the clock signal 2a according to the data signal 2a. That is to say, the pulse of the laser driving signal 4a is radiated before the falling edge of the clock signal when the value of the data signal 2a is at its high level. When the value of the data signal 2a is at its low level, the pulse of the laser driving signal 4a is radiated after the falling edge of the clock signal. As a result, a mark 1a recorded on the recording medium 8 is so modulated as to be displaced forward or backward. That is to say, a phase-modulated signal has been recorded. If a low-power laser beam for play-back is then applied to this recording medium 8, polarization of that reflected beam is rotated by the Kerr effect. The direction of rotation of this polarization differs depending upon whether the magnetization direction of the recording medium is upward or downward. Outputs of two detectors 14a and 14b are proportionate to intensities of polarization components differing in phase by 90 degrees. By deriving the difference between them, therefore, an output proportionate to the rotation of the polarization caused by the Kerr effect is obtained. Therefore, the play-back signal 5 based upon the polarization rotation of a beam reflected by the recording beam 8 reflects the proportion of the mark located within the light spot. If this play-back signal is sliced with an appropriate level and held by a sampling pulse 6, play-back data 7 is obtained. The data signal 2 is thus reconstructed faithfully.

In over-writing operation, the laser driving signal 4b is generated according to over-writing data 2b in the same way as the recording process. On the basis of this laser driving signal 4b, a laser pulse is radiated onto the recording medium 8 having old data already recorded thereon. The position whereto this laser pulse is radiated is displaced a little forward or backward from the position of the mark recorded first. Therefore, the old mark moves to the position whereat the laser beam has been newly radiated. That is to say, old recording information is replaced by new recording information, over-writing having been thus formed.

In the present embodiment, magnetic field applying means is not especially required unlike the magneto-optical recording drive. Therefore, the size of the apparatus is reduced, and the cost is also largely lowered. Further, since over-writing is possible, the data transfer rate in the writing operation is increased to 10 Mbits/sec, which is comparable to the value of the high speed case of the prior art.

EMBODIMENT 2

In the embodiment 1, information is written by displacing the mark position forward or backward with respect to the programs direction of the light spot. However, it is also possible to write information by moving the mark position in a direction perpendicular to the progress direction of the light spot. This example is shown in FIG. 5.

Figure 9:
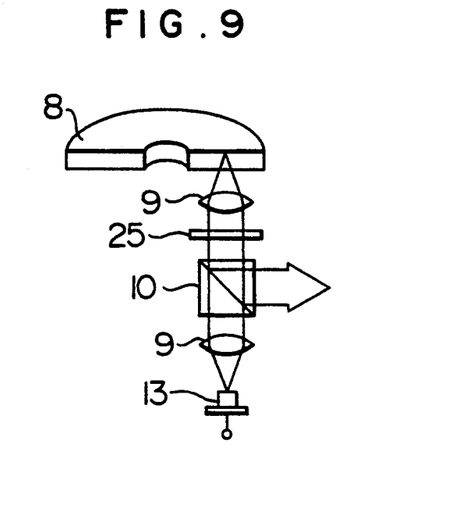

With reference to FIG. 5, the position of a mark 1 is modulated to the left or right with respect to a track 18 depending upon whether the value of the data signal is at the high level or the low level. In over-writing operation in this case as well, a light spot is radiated on the mark 1 and a reversed domain having such a size as to embrace the mark 1 is formed once. Thereafter, the reversed domain contracts and becomes a new mark. In the same way as the embodiment 1, the position whereat this new mark is formed depends upon the position of the light spot radiated in the over-writing operation. For moving the position of the light spot radiated in the over-writing operation to the left or right with respect to the track 18, an apparatus as shown in FIG. 9, for example, is used. A beam emitted from a laser 13 passes through a lens 9 and a beam splitter 10. The beam passed through a SAW deflector 25 so inserted as to follow them is focused onto a recording medium 8 by a lens 9. The SAW deflector generates a kind of grating on the deflector by using a surface acoustic wave (SAW) and deflects the progress direction of the beam passing through the deflector. Therefore, the position of the light spot resulting from focusing by the lens 9 is moved. By modulating and driving the SAW deflector 25 in response to over-writing data, marks modulated as shown in FIG. 5 can be recorded. In this example as well, the sample servo method is used as the servo method in the same way as the embodiment 1.

In the example shown in FIG. 5, the more position is modulated to both left and right sides with respect to the track 18 in response to the data signal. As a matter of course, however, the mark position may be modulated to one side.

Further, the data signal is not limited to bi-state signals, but multi-state signals such as tristate signals or analog signals may also be used. In that case, the amount of movement of the reversed domain may be defined according to the multi-state data signal or the analog signal.

EMBODIMENT 3

The apparatus has configuration similar to that of the embodiment 1 as shown in FIG. 2. In this example, a stripe reversed domain 27 is formed beforehand as shown in FIG. 6 and writing operation is performed by moving the position of the side of striped reversed domain.

That is to say, a light spot 19 is radiated at the position of the side of the stripe reversed domain 27 as shown in FIG. 6 to perform the signal write-read operation. When the intensity of the light spot 19 is large, the position of the side moves in such a direction as to broaden the stripe reversed domain 27. When the intensity of the light spot 19 is small on the contrary, the position of the side moves in such a direction as to narrow the stripe reversed domain 27. Since this does not depend upon the position of the first side but depends only upon the intensity of the beam radiated later, over-writing is realized.

For this purpose, a writing method of moving the positions of both sides of the stripe reversed domain 27 as shown in FIG. 7, i.e., of changing the width of the stripe reversed domain 27, may also be used. In this case, the light spot 19 is so radiated as to extend over both sides of the stripe reversed domain 27.

In case of this embodiment 3, the servo system is not limited to the pre-formatted clock pit system, but, a continuous servo method using a continuous groove may also be used. Since in this case the stripe reversed domain is formed beforehand, however, it is convenient to perform servo control using the stripe reversed domain itself.

The medium need not be disklike in configuration, but a recording medium of card type, for example, may be used.

EMBODIMENT 4

FIG. 8 shows an embodiment in which two beams, i.e., a preceding erasing beam 20 and a writing beam 21 are used. By the preceding erasing beam 20, a reversed mark 22 already recorded is erased and a stripe reversed domain 27 is formed. Thereafter, the reversed mark 22 is formed by the writing beam 21. When the reversed mark 22 and the stripe reversed domain 27 are to be formed in this embodiment, a stray field generated from the recording medium 8 is used. Therefore, bias magnetic field applying means is not required. Therefore, the above described two beams can be radiated from one lens at the same time, resulting in small size and low cost of the apparatus.

Since pre-formatted clock pits are not required in this embodiment, any servo method may be used. Especially for stabilizing the shape of the stripe reversed domain 27, the servo method using a continuous groove is suitable. It is more appropriate to use a continuous groove having a rectangular or U-shaped sectional shape because the stripe reversed domain 27 does not expand into the groove in that case.

EMBODIMENT 5

Information is written by using the size of the mark as shown in FIG. 10. When a data signal 2 is at its high level, the laser generates a pulse having wide width as indicated by a laser output 26 to form a large mark. When the data signal 2 is at its low level on the contrary, the laser generates a pulse having narrow width to form a small mark. In this case as well, a laser beam modulated by over-writing data is radiated on a mark already recorded in the same way as the embodiments 1 and 2. Therefore, old recording information is completely erased, over-writing being realized. As for the servo method, the laser beam must be radiated on data already recorded. Therefore, a servo method using pre-formatted clock pits such as the sampled servo method is appropriate.

EMBODIMENT 6

With reference to FIG. 11, a laser beam is radiated onto the recording medium 8 as illustrated by an output 26 of the laser beam. That is to say, a laser beam having a form of short pulses is repetitively radiated at short intervals. This interval is shorter than the time taken for the laser beam to move relatively with respect to a mark on the recording medium 8 and pass the mark 1. That is to say, a second pulse beam is radiated onto the mark 1 formed by the first pulse beam. Therefore, the mark 1 moves from the position whereat the first pulse beam is radiated to the position whereat the second pulse beam is radiated. Thereafter, the marx 1 successively moves as a result of radiation of third and fourth pulse beams. At this time, the laser radiation interval is prolonged or a laser pulse is not radiated at a position where information is to be written as represented by the output 26 of the laser beam. Since movement of the mark 1 stops at that position, the mark 1 is written there. If a pulsative beam is then radiated again, a new mark is formed. The mark moves with radiation of the second and third beams as described before.

In case of over-writing in this embodiment, any servo method may be used. Therefore, a servo method using a continuous groove similar to the conventional method can be used. Further, a conventional method such as run length recording as it is can be used is the modulation method. Therefore, it is also possible to maintain interchangeability with a conventional magneto-optical recording medium.

EMBODIMENT 7

It is also possible to perform writing corresponding to a data signal 2 having multi-state information as shown in FIG. 12. In case of this example, writing is performed by modulating the pulse width of a laser beam radiated onto the recording medium on the basis of whether the data signal is large or small, the size of the mark 1 being thus modulated. In this case as well, the laser beam modulated by over-writing data is radiated on a mark already recorded in the same way as the embodiments 1 and 2. Therefore, old recording information is completely erased, over-writing being realized.

Such multi-state writing is not limited to the present embodiment, but is possible in any one of the cases described above. In that case, the pulse width of the radiated laser beam may undergo multi-state modulation in the same way as the present embodiment. Otherwise, the intensity, the radiation time, the radiation position or the like of the laser beam may undergo multi-state modulation. Further, in the same way, analog modulation may also be used.

EMBODIMENT 8

Figure 13:
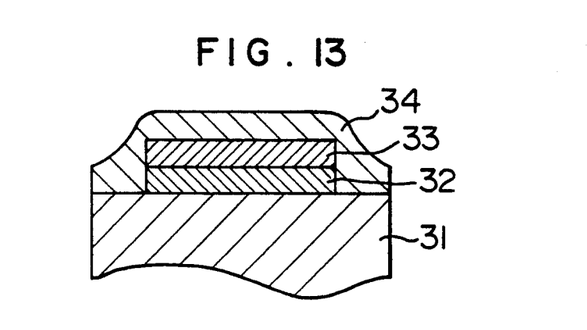
FIG. 13 is a schematic diagram showing the sectional structure of a disk.

A schematic diagram showing the sectional structure of an optical disk fabricated in the present embodiment is shown in FIG. 13. The disk was fabricated as hereafter described. First of all, a silicon nitride underlayer film 32 was so formed on a substrate 31 as to have thickness of 85 nm by using a sputtering method. Successively, a $Tb_{24}Fe_{63}Co_{10}Nb_3$ information recording film 33 was so formed as to nave thickness of 120 nm by using the sputtering method. Thereafter, a silicon nitride protection film 34 was so formed as to wrap the whole of two layers described above and have film thickness of 150 nm by using the sputtering method.

Writing operation was performed by using this disk, while changing the pulse width. At this time, the laser power was 9 mW and the bias magnetic field was not applied. The relationship between the obtained reversed domain size and the pulse width is shown in FIG. 14. As the pulse width becomes longer, the side of the reversed domain thus becomes larger in proportion thereto. How the play-back signal output increases in proportion to the reversed domain size is shown in FIG. 15. By using the fact that the play-back signal output was thus in proportion to the domain diameter, multi-state writing operation was performed. In the present embodiment, writing was performed at intervals of 0.2 μm in domain size. Six states comprising 0, 1, 2, 3, 4 and 5 could be written. Further, by stopping down the laser beam, adjusting the optical system, controlling the magnetic characteristic of the information recording film and optimizing the disk structure, precise control of the reversed domain size was possible. Results of experiment of over-writing operation are shown in FIG. 16. First of all, writing was performed with laser power of 9 mW and pulse width of 200 ns. A reversed domain having a diameter of 1.2 μm was thus formed. When writing operation was successively performed at the same position under the condition of 160 ns, 120 ns, 80 ns, 40 ns and 20 ns, the reversed domain size became smaller as 0.8 μm, 0.4 μm, 0.2 μm and then 0. If this writing is not performed in order but writing is performed with pulse width of 200 ns and thereafter writing is performed with pulse width of 120 ns, for example, a diameter of 0.6 μm is obtained, resulting in over-writing. When sweeping is performed by using a continuously oscillated laser beam, information is erased. Therefore, it is also possible to apply consecutive pulses continuously oscillated immediately before a recording pulse to be newly recorded and thereafter apply an information pulse. Further, either of the absolute value of the signal and the differential signal output may be used as the play-back signal. Further, the reference signal may be formed beforehand when the substrate is fabricated, or it may be formed after the disk has been fabricated. However, it is important that repetitive play-back can be tolerated. It is a matter of course that introduction of this technique provides high precision at the time of signal play-back.

In this way, writing can be performed without using a bias magnetic field. Moreover. over-writing is possible. This is made possible centering around the recording-erasing condition. It does not depend upon the disk structure. A four-layer structure having a reflective film may also be used. Further, the same may be said of magnetic characteristics. In any event, examination of that condition is important.

EMBODIMENT 9

In the present embodiment, image information is recorded onto an optical disk. Its principle: is shown in FIG. 17. The structure of a disk used here is the same as that of the embodiment 1. A laser beam 37 emitted from a light source 35 scans a predetermined region 36 on a disk in the lateral direction and in the vertical direction. Recording points 38 are formed at various positions. At this time, recording may be performed while changing the size of the reversed domain by controlling the pulse width. Or the face density of the formed reversed domain may be controlled under the condition that the pulse width is fixed. Either case will do so long as halftone is formed, and does not depend upon the technique. The principle of recording is shown in FIG. 17. As a result, an important matter in image information recording is a synchronous signal. Synchronous signals may be accommodated collectively in a predetermined region within the disk, or the synchronous signal may be accommodated in each recording region. Further, a certain clock may also be provided within the apparatus. This is not the essence of the present invention. Owing to the technique of the present embodiment, the image information can thus be stored easily. Further, application or this half-tone recording is not limited to image information. It is also possible to perform multi-state recording by providing several kinds of half-tones.

EMBODIMENT 10

In the present embodiment, holography recording is performed. In order to realize this, the laser power and the pulse width are fixed. The shape of the laser beam spot is not made circular but made elliptical. Techniques such as such contrivance of the spot shape and recording a factor indicating information within the spot were used. This example is schematically shown in FIG. 18. The disk used here has the same structure as that of the embodiment 1.

First of all, the case where the spot shape is changed will now be described. In this case, the direction of the elliptical spot is changed. For example, four-state recording is performed in the example shown in FIG. 18A. By using an asymmetric shape of a reversed domain such as a shape like tear drop instead of a laterally symmetrical ellipse, recording with a larger number of states becomes possible. The case where multi-state information is stored within recorded marks (comprising collection of reversed domains) having the same size will now be described. In the example shown at the bottom of FIG. 18B, information (such as stripes) is formed within a recorded mark. Information is represented by the stripe direction. A technique using light interference, for example, is used for reproduction. Further, if recording is performed by using a technique comprising a combination of these two techniques, recording with a larger number of states becomes possible.

In the embodiments heretofore described, the reversed domain size is fixed. Even if the reversed domain size is made variable and in addition the shape of laser spot is made variable or stripes are formed within the recorded mark, multi-state recording can be performed. It is a matter of course that over-writing is possible in this case as well.

In any case of the above described embodiments, a fixed magnetic field may be applied ° t the time of recording in order to perform recording more stably. As the means for applying this fixed magnetic field, a permanent magnet, for example, may be used. A stray field from a lens actuator driving a lens for the purpose of automatic focus control and tracking may also be used. From the viewpoint of reduction in apparatus size, the latter one is more preferable.

The present invention makes it possible to over-write new information without erasing beforehand information already recorded by only controlling the intensity, pulse width, radiation position and radiation time of the laser beam without providing special bias magnetic field applying means for reversing the magnetic field. In this case, residue is not caused. As for the data transfer rate in recording operation, high speed comparable to that of conventional high-speed magneto-optical recording operation is obtained. Further, since reversible bias magnetic field applying means is not required, the apparatus becomes simple in configuration, small in size, and low in cost.

Further, the present invention makes possible multi-state recording because the reversed domain can be changed by controlling the pulse width. Further, half-tone recording can be performed by controlling the face density of the reversed domains and the size of the reversed domain. As compared with the conventional bi-state ("0" and "1") recording in the optical disk, the recording density is improved. Further, image recording is also possible as application of half-tone recording. Rewritable, xerography, for example, can be mentioned.

These series of recording operations can be performed by using an information recording medium having the same perpendicular magnetic anisotropy as that of the prior art such as a magneto-optical recording film. Unlike the conventional magneto-optical recording film, however, the bias magnetic field may not be applied, resulting in a simplified optical head.

What is claimed is:

1. A magneto-optical recording device for radiating a laser beam according to recording information onto a magneto-optical recording medium having an easy axis of magnetization in a direction perpendicular to a film face of the recording medium itself to form a reversed domain and record information, comprising:
   means for forming a reversed domain smaller than a light spot by radiating said laser beam while applying a magnetic field having a fixed intensity and means for moving the position of said reversed domain within the region of said light spot to record information;
   wherein said means for moving the position of said reversed domain within the region of said light spot to record information comprises means for radiating a laser beam in a pulsative form nearly with a fixed period and for radiating a laser beam at a time shifted one of forward and backward from the fixed period according to the recording information.

2. A magneto-optical recording device for radiating a laser beam according to recording information onto a magneto-optical recording medium having an easy axis of magnetization in a direction perpendicular to a film face of the recording medium itself to form a reversed domain and record information, comprising:
   means for forming a reversed domain smaller than a light spot by radiating said laser beam while applying a magnetic field having a fixed intensity and means for moving the position of said reversed domain within the region of said light spot to record information;
   wherein said means for moving the position of said reversed domain within the region of said light spot to record information comprises means for changing one of the magnitude of movement of the position of said reversed domain and the magnitude of shift of radiation time of the laser beam in one of a multi-state digital manner having two or more states and an analog manner according to recording information to record information.

3. A magneto-optical recording device for radiating a laser beam according to recording information onto a magneto-optical recording medium having an easy axis of magnetization in a direction perpendicular to a film face of the recording medium itself to form a reversed domain and record information, comprising:
   means for changing a diameter of the reversed domain to record information including means for changing one of the intensity of the laser beam and the radiation time of the laser beam and means for applying a magnetic field having a fixed intensity to the reversed domain;
   wherein said means for changing the diameter of said reversed domain changes the diameter of said reversed domain in one of a multi-state digital manner having two or more states and an analog manner according to recording information to record information such that the diameter of the reversed domain represents the recorded information.

4. A magneto-optical recording device according to claim 3, wherein the reversed domain is substantially circular.

5. A magneto-optical recording device for radiating a laser beam according to recording information onto a magneto-optical recording medium having an easy axis of magnetization in a direction perpendicular to a film face of the recording medium itself to form a reversed domain and record information, said magneto-optical recording device comprising:
   means for radiating a laser pulse beam onto said magneto-optical recording medium; and
   means for controlling the diameter of a formed reversed domain to record information;
   wherein said controlling means controls the diameter of the reversed domain by controlling the pulse width of the laser pulse beam.

6. A magneto-optical recording device for radiating a laser beam according to recording information onto a magneto-optical recording medium having an easy axis of magnetization in a direction perpendicular to a film face of the recording medium itself to form a reversed domain and record information, said magneto-optical recording device comprising:
   means for radiating a laser pulse beam onto said magneto-optical recording medium; and
   means for controlling the diameter of a formed reversed domain to record information;
   wherein the controlling means includes means for controlling the radiating means to modulate the pulse width of the laser pulse beam in accordance with information to be stored in the medium wherein the modulated pulse widths corresponds to modulated heating of the area to be recorded such that a greater area is heated by longer pulse widths.

* * * * *